US008031419B2

(12) United States Patent
Fan et al.

(10) Patent No.: US 8,031,419 B2
(45) Date of Patent: Oct. 4, 2011

(54) COMPACT IMAGING DEVICE (75) Inventors: Kin Ming Fan, New Territories (HK); Kai Cheong Kwan, Wong Tai Sin (HK); Kwok Sing Cheng, Tuen Mun (HK); Sio Kuan Lam, New Territories (HK)

(73) Assignee: Hong Kong Applied Science and Technology Research Institute, Co., Ltd., Shatin, New Territories (HK)

( * ) Notice: Subject to any disclaimer, the term of this patent is extended or adjusted under 35 U.S.C. 154(b) by 0 days.

(21) Appl. No.: 12/510,924

(22) Filed: Jul. 28, 2009

(65) Prior Publication Data
US 2011/0026149 A1 Feb. 3, 2011

(51) Int. Cl.
*G02B 7/02* (2006.01)
*G02B 15/14* (2006.01)

(52) U.S. Cl. .......................... 359/824; 359/823; 359/696

(58) Field of Classification Search .......... 359/694–700, 359/811–824; 396/72, 79, 85, 133; 310/309
See application file for complete search history.

(56) References Cited

U.S. PATENT DOCUMENTS

| | | | | |
|---|---|---|---|---|
| 5,289,318 A * | 2/1994 | Sekine et al. | ................ | 359/813 |
| 5,572,372 A * | 11/1996 | Sekine et al. | ................ | 359/824 |
| 7,227,285 B2 * | 6/2007 | Osaka | ............................ | 310/15 |
| 7,291,942 B2 * | 11/2007 | Osaka | ........................ | 310/12.04 |
| 7,486,882 B2 | 2/2009 | Okita et al. | ..................... | 396/55 |
| 7,542,667 B2 * | 6/2009 | Chen | ................................ | 396/85 |
| 7,679,839 B2 * | 3/2010 | Polyakov et al. | ............. | 359/694 |
| 7,715,130 B2 * | 5/2010 | Tsai | ............................... | 359/824 |
| 7,729,069 B2 * | 6/2010 | Chang | ............................ | 359/824 |
| 7,808,730 B2 * | 10/2010 | Yoon | ............................ | 359/826 |
| 2007/0010424 A1 | 1/2007 | Pedersen et al. | .............. | 396/133 |
| 2007/0047938 A1 | 3/2007 | Suzuki et al. | ................... | 396/89 |
| 2007/0065131 A1 | 3/2007 | Wei et al. | ......................... | 396/89 |
| 2008/0186601 A1 | 8/2008 | Honma | ........................ | 359/824 |
| 2008/0192124 A1 | 8/2008 | Nagasaki | ................. | 348/208.11 |
| 2009/0015796 A1 | 1/2009 | Maeda et al. | ................... | 353/20 |
| 2009/0085138 A1 | 4/2009 | Ryu et al. | ...................... | 257/434 |

FOREIGN PATENT DOCUMENTS

| | | |
|---|---|---|
| CN | 101315456 A | 12/2008 |
| CN | 201273955 Y | 7/2009 |

OTHER PUBLICATIONS

International Search Report and the written opinion of the international searching authority, or the declaration dated Apr. 29, 2010 for PCT/CN2009/073029 in 11 pages.
Response to Non-Final Office Action for related U.S. Appl. No. 11/499,906, filed May 26, 2009, 19 pages.
Non-Final Office Action for related U.S. Appl. No. 11/499,906 mailed Jan. 26, 2009, 33 pages.

* cited by examiner

*Primary Examiner* — Mohammed Hasan
(74) *Attorney, Agent, or Firm* — Berkeley Law & Technology Group, LLP (57) ABSTRACT

An imaging apparatus may comprise a lens assembly including one or more lenses, an image sensor to receive light from the lens assembly, and an actuator to adjust a position of the lens assembly. An actuator may be mounted on an image sensor, wherein a surface area of the actuator need not extend substantially beyond a surface area of the image sensor.

11 Claims, 8 Drawing Sheets

COMPACT IMAGING DEVICE

FIELD

The subject matter disclosed herein relates to an imaging device having a small form factor.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can fit into limited space of the apparatuses.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

Embodiments described herein include a compact imaging module that provides a mechanism and/or allows a process to adjust a distance between an imaging lens and an image sensor, wherein a footprint of the compact module may be substantially the same as or less than a footprint of the image sensor, for example. In other words, a surface area of a compact imaging module may not extend substantially beyond a surface area of an image sensor. Such a compact imaging module may provide an advantage to designers incorporating such a module into increasingly slimmer, smaller, and/or lighter portable electronic apparatuses, such as a compact camera, for example.

As used to describe such embodiments, terms "above", "below", and "side" described positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example.

In a particular embodiment, such a footprint may be achieved by arranging an actuator to be above and/or below a lens assembly, as opposed to arranging an actuator to surround sides of a lens assembly. In a particular embodiment, for example, a structure of a compact imaging module, such as a compact camera module, may provide auto-focus and/or other imaging functions, in which an actuator is mounted above and/or below an imaging lens. Such an actuator may also comprise a surface area that does not extend substantially beyond a surface area of an image sensor of the compact camera module. In comparison, for example, an actuator of a compact camera module situated on a side of such an imaging lens may result in a relatively larger imaging module profile. Such a relatively large profile may prohibit a compact camera module to have a footprint that is substantially equal to or smaller than a footprint of its image sensor. In one implementation, such an actuator may comprise a magnet and a coil to impart a magnetic force on a lens assembly. Such a magnet may have a flat or planar shape, such as the shape of a flat disk, for example. A magnet may be a permanent magnet or electromagnetic field generator, such as a coil, for example. Such a coil may be a wound coil, printed coil, and/or an electroplated coil on a substrate. A compact imaging module may comprise a spring to provide a restoring force to the lens assembly.

In other embodiments, a compact imaging module may include an actuator having a coil that moves with a lens assembly if the coil is energized. In another configuration, a compact imaging module may comprise an actuator having a coil and a magnet, wherein the magnet may move with a lens assembly if the coil is energized.

In one particular implementation, such an actuator may comprise four magnets that may be arranged in one plane. In another particular implementation, such an actuator may comprise four coils that may be arranged in one plane. Such four coils may be electrically connected in series or at least two of four coils may be electrically connected in parallel. In another particular implementation, such four coils may be mounted on and/or sit on a lens assembly of a compact imaging module.

In another embodiment, a compact imaging module may include an actuator comprising at least two sets of coils to produce an electromagnetic force, wherein each set of the coils is positioned in two parallel planes. In one particular implementation, such two sets of coils may be arranged substantially orthogonal to an optical axis of a lens assembly of the compact imaging module. In another particular implementation, one set of the two sets of coils may move with the lens assembly if the two sets of coils are energized, for example. Of course, such details of a compact imaging module are merely examples, and claimed subject matter is not so limited.

In an embodiment, a compact imaging module may result from mounting a lens assembly including one or more lenses to a portion of an actuator, and positioning an image sensor to receive light from the lens assembly, wherein the actuator may include a leaf spring that is between the image sensor and the lens assembly. In one implementation, such a compact imaging module may comprise a lens assembly, at least one actuator to adjust the position of the lens assembly, and an image sensor, wherein at least a portion of the actuator may be disposed between the lens assembly and the image sensor. For example, an actuator may comprise a leaf spring that is disposed between a lens assembly and an image sensor. In one particular implementation, such an actuator may comprise a magnet and a coil that are also disposed between a lens assembly and an image sensor. For example such an actuator may be mounted on the image sensor and/or the lens assembly may be mounted on the actuator. In another particular implementation, such an actuator may comprise a magnet and a coil that are disposed above a lens assembly while a leaf spring is disposed below the lens assembly. In either implementation, such an actuator may drive a lens assembly vertically to adjust the position of the lens assembly with respect to an image sensor. As used herein, "vertically" refers to a direction substantially parallel to an optical axis of a compact imaging module, whereas "horizontally" refers to a direction substantially perpendicular to an optical axis of a compact imaging module. Of course, such details of a compact imaging module are merely examples, and claimed subject matter is not so limited.

An actuator may provide a relatively precise control of motion of a lens assembly, so that various imaging functions, such as focusing for example, may lead to an improved image quality. An advantage of such a compact module is that its footprint may be substantially equal to or smaller than a footprint of an image sensor, so that a surface area of the compact module does not extend substantially beyond a surface area of the image sensor. Moreover, a batch manufacturing process may be applied to such a compact module that includes a properly designed actuator. Such a batch process may occur on a wafer level process, for example. Such a process may lead to a relatively high manufacturing efficiency, thus lowering manufacturing costs of a camera, for example, due to a focus variation function provided by the compact module.

Figure 1:
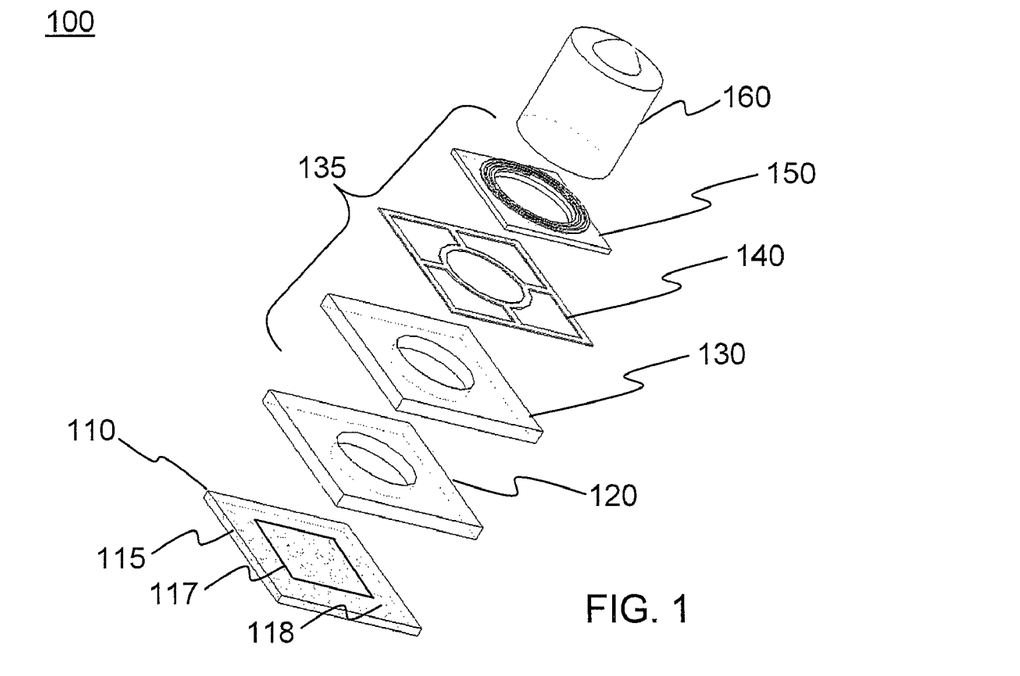
FIG. 1 is a perspective view of components that comprise a compact imaging module, according to an embodiment.

FIG. 1 is a perspective view of components that comprise a compact imaging module, according to an embodiment. Such an imaging module may comprise an image sensor 110 having a ball grid array interface 115, though such an imaging module may instead include a number of different types of electrical connections. Image sensor 110 may comprise an active region 117 including an array of pixilated charge-coupled devices (CCD) and/or one or more complementary metal-oxide-semiconductor (CMOS) devices, just to name a couple of examples.

In an embodiment, imaging module 100 may further comprise a lens assembly 160, which may include one or more lenses to provide an image onto active region 117 of image sensor 110. Such an image need not comprise visible wavelengths, but may also comprise infrared and/or ultraviolet wavelengths, for example. So that such an image is focused onto active region 117, an actuator 135 may adjust a position of lens assembly 160 with respect to image sensor 110. In a particular implementation, actuator 135 may adjust a vertical position of at least a portion of lens assembly 160 with respect to image sensor 110. As mentioned above, such a lens assembly may comprise one or more lenses so that the vertical position of one or more of such lenses may be adjusted as a group. In a particular implementation, actuator 135 may comprise a magnet 130, a leaf spring 140, and/or a coil 150. Imaging module 100 may further comprise a spacer 120 disposed between actuator 135 and image sensor 110, for example. Though for the present embodiment actuator 135 is described as comprising components that are all arranged below lens assembly 160, in another embodiment, as described in detail below, an actuator may comprise components that may be arranged to be above and/or below a lens assembly.

Figure 2:
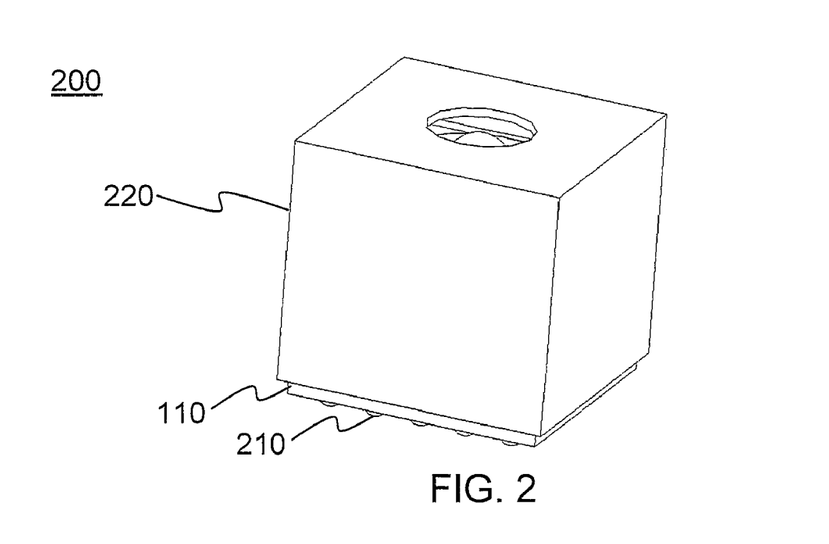
FIG. 2 is a perspective view of a compact imaging module, according to an embodiment.

FIG. 2 is a perspective view of a compact imaging module 200, according to an embodiment. Such a module may comprise compact imaging module 100 shown in FIG. 1. For example, compact imaging module 200 may comprise a casing 220 to cover components of compact imaging module 100. Such a casing may be mounted on image sensor 110, which may include ball grid array 210 for electrical connections between compact imaging module 200 and one or more system components (not shown) such as control circuitry or the like.

Figure 3:
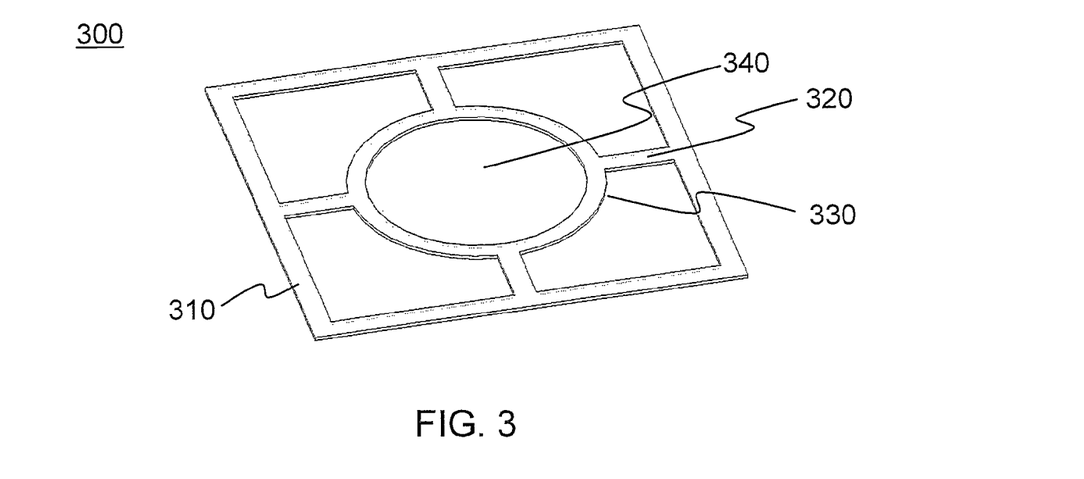
FIG. 3 is a perspective view of a spring, according to an embodiment.
Figure 4:
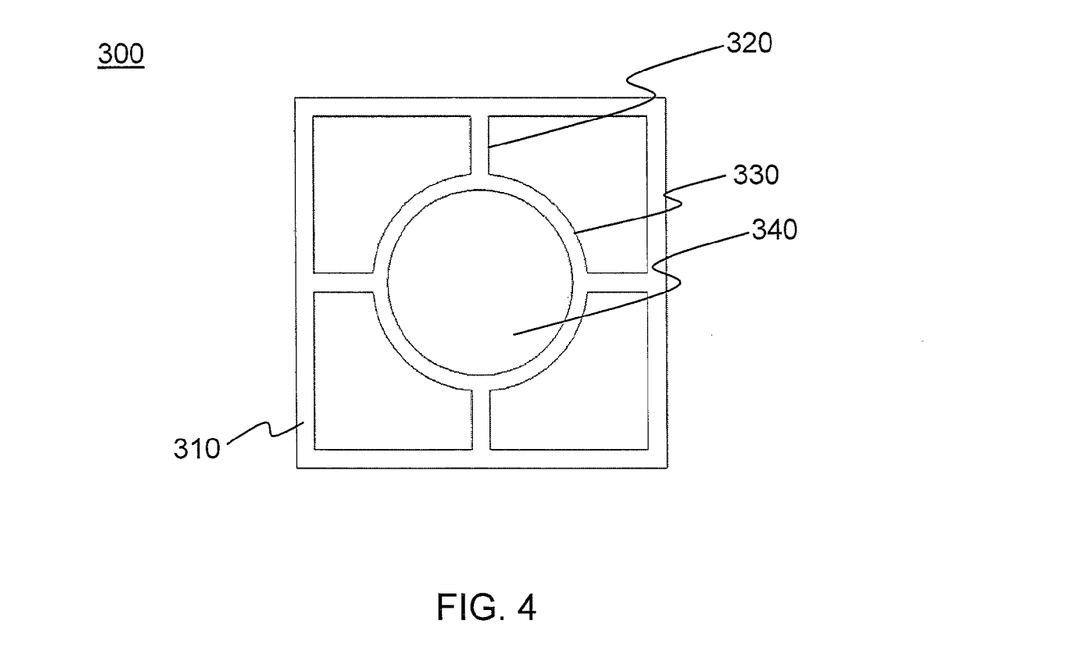
FIG. 4 is a top view of a spring, according to an embodiment.

FIG. 3 is a perspective view of a spring 300 and FIG. 4 is a top view of spring 300, according to an embodiment. Such a spring may comprise a leaf spring such as leaf spring 140 shown in FIG. 1, for example. In one implementation, spring 300 may comprise a central portion 330 and an arm portion 320 adapted to move or flex as a spring. For example, central portion 330 and an arm portion 320 may provide a restoring force if central portion 330 and an arm portion 320 are displaced from a neutral configuration. A fixed portion 310 may comprise an outer portion of spring 300 which is fixedly mounted to one or more components of compact imaging module. For example, central portion 330 and arm portion 320 may flex in a spring-like manner while fixed portion 310 is held in a relatively fixed position. Spring 300 may further comprise an aperture 340 to allow light along an optical axis to travel past spring 300. Of course, such details of spring 300 are merely examples, and claimed subject matter is not so limited.

Figure 5:
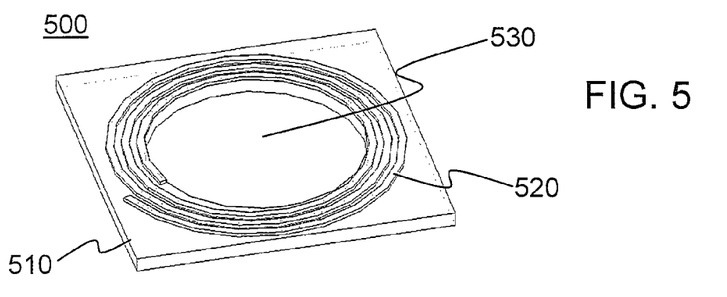
FIG. 5 is a perspective view of a coil, according to an embodiment.
Figure 6:
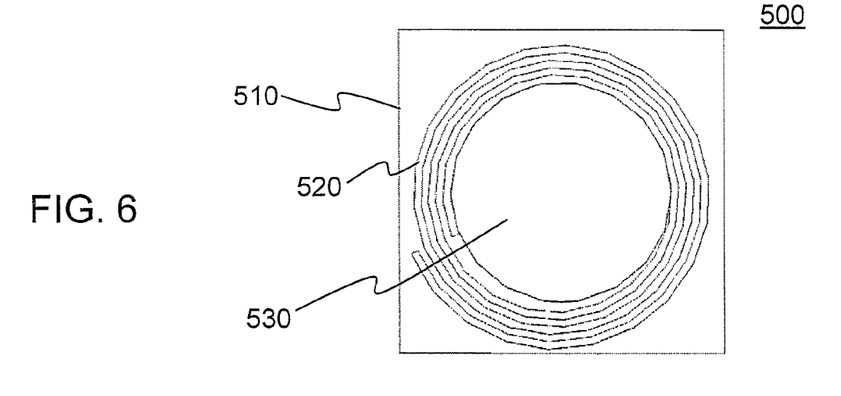
FIG. 6 is a top view of a coil, according to an embodiment.

FIG. 5 is a perspective view of a coil 500 and FIG. 6 is a top view of coil 500, according to an embodiment. Such a coil may comprise coil 150 shown in FIG. 1, for example. In one implementation, a lens assembly, such as lens assembly 160 shown in FIG. 1, may be mounted to coil 500, comprising a conductor 520 mounted on a substrate 510. Conductor 520 may comprise multiple loops of wire in one or more layers of substrate 510. An electrical current travelling through such loops of conductor 520 may induce a magnetic field to impart a force on a magnet, such as magnet 130 shown in FIG. 1, for example. In such a case, spring 140 may provide a restoring force to counter such a magnetic force, thereby providing a mechanism to adjust a vertical position of lens assembly 160 with respect to image sensor 110. Coil 500 may further comprise an aperture 530 to allow light along an optical axis to travel past coil 500. Of course, such details of coil 500 are merely examples, and claimed subject matter is not so limited.

Figure 7:
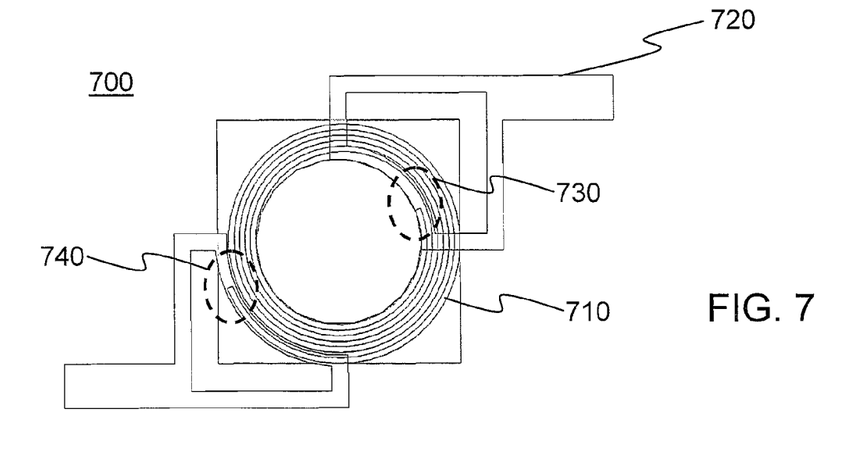
FIG. 7 is a top view of a coil-spring component, according to an embodiment.

In one embodiment, a spring and a coil may be combined as one component, and FIG. 7 is a top view of an example of such a coil-spring component 700. A spring portion of such a combined component may provide electrical current to a coil portion, for example. For example, such a combined component may comprise a coil 710 and an electrode 720, which may also comprise a leaf spring, to conduct electrical current from an external source (not shown) to coil 710. Portions 730 and 740 show connection areas where electrical current may be transferred from conductor 720 to coil 710 or vise versa.

Figure 8:
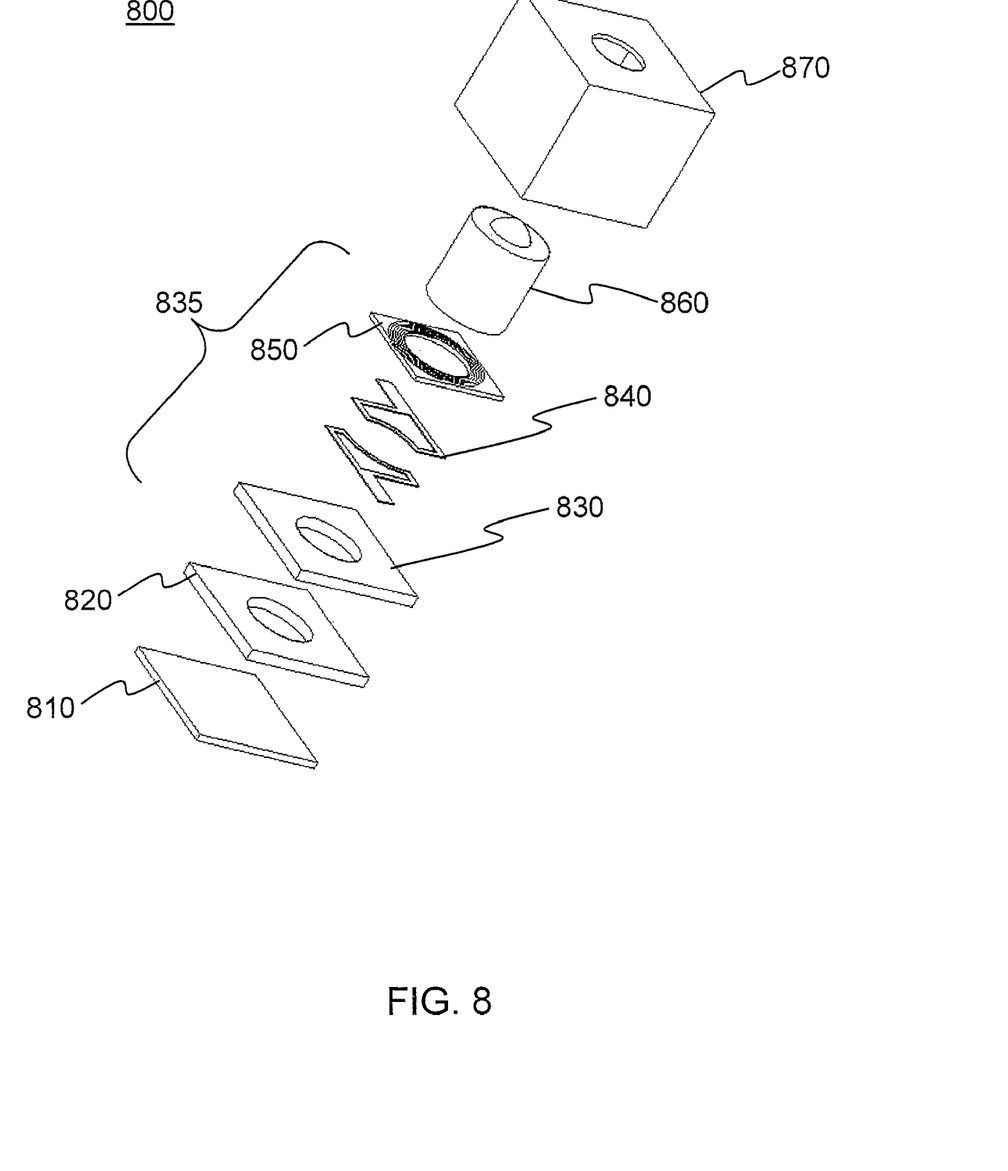
FIG. 8 is a perspective view of components that comprise a compact imaging module, according to another embodiment.

FIG. 8 is a perspective view of components that comprise a compact imaging module 800, according to an embodiment that may incorporate coil-spring component 700. Such an imaging module may comprise an image sensor 810, which may be similar to image sensor 110 shown in FIG. 1, for example. Imaging module 800 may further comprise a lens assembly 860, which may include one or more lens units to provide an image onto an active region (not shown) of image sensor 810. Such an image need not comprise visible wavelengths, but may also comprise infrared and/or ultraviolet wavelengths, for example. So that such an image is focused onto image sensor 810, an actuator 835 may adjust a vertical position of lens assembly 860 with respect to image sensor 810. Described in another way, actuator 835 may adjust a distance between lens assembly 860 and image sensor 810 to adjust a focus. Such a lens assembly may comprise one or more lenses so that the vertical position of one or more of such lenses may be adjusted. In a particular implementation, actuator 835 may comprise a magnet 830, a spring-conductor 840, and/or a coil 850. As described above, spring-conductor 840 and coil 850 may comprise a single component such as coil-spring component 700 shown in FIG. 7. In such a single component, spring-conductor 840 may provide electrical current to coil 850. Imaging module 800 may further comprise a spacer 820 disposed between actuator 835 and image sensor 810, for example. Coil 850 is attached to lens assembly 860. If energized, a magnetic field produced by electric current flowing in coil 850 interacting with magnet 830 positioned below coil 850 may provide a force to move lens assembly 860 and coil 850 along the optical axis. In another configuration, magnet 830 may be positioned above coil 850. Of course, such details of a compact imaging module are merely examples, and claimed subject matter is not so limited.

Figure 9:
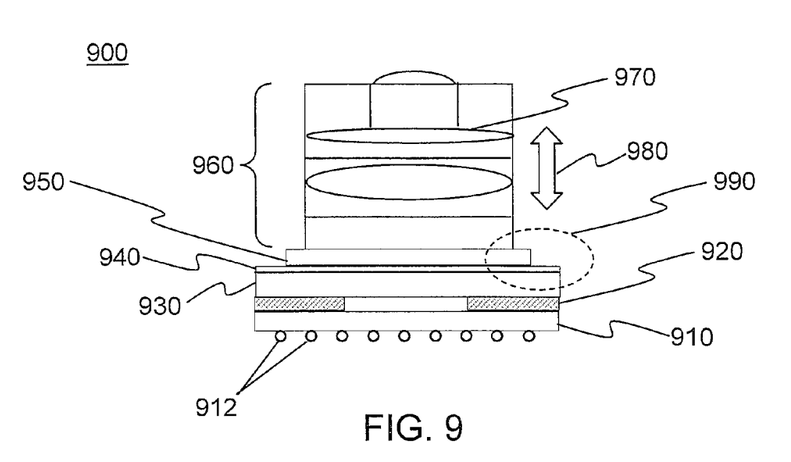
FIG. 9 is a side view of a compact imaging module, according to an embodiment.

FIG. 9 is a side view of a compact imaging module 900, according to an embodiment. Such an imaging module may comprise an image sensor 910, which may be similar to image sensor 110 shown in FIG. 1, for example. Imaging module 900 may further comprise a lens assembly 960, which may include one or more lens units 970 to provide an image onto an active region (not shown) of image sensor 910. As mentioned above, such an image need not comprise visible wavelengths, but may also comprise infrared and/or ultraviolet wavelengths, for example. So that such an image is focused onto image sensor 910, an actuator may adjust a position of lens assembly 960 with respect to image sensor 910. Such positioning is depicted by arrow 980, for example. Such an actuator, which is disposed below lens assembly 960, may comprise a magnet 930, a leaf spring 940, and a coil 950. Such a lens assembly may comprise one or more lenses, as described in further detail below, so that the vertical position of one or more of such lenses may be adjusted. In a particular implementation, compact imaging module 900 may further comprise a spacer 920 disposed between magnet 930 and image sensor 910, for example. Image sensor 910 may comprise ball grid array 912 for electrical connections to one or more external components (not shown).

Figure 10:
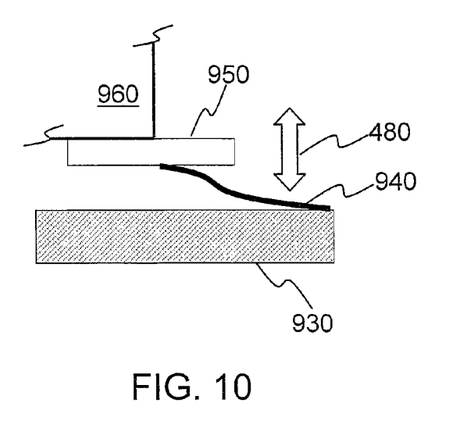
FIG. 10 is a close-up view of an activated actuator, according to an embodiment.

Portion 990 depicts a region of compact imaging module 900 that may vary in configuration in response to actuator operation. Example configurations of portion 990 are shown in detail in FIGS. 10 and 11. Spacer 920 is not shown in FIGS. 10 and 11 for clarity. As shown in FIG. 10, such an actuator may be activated if, for example, an electrical current travels through coil 950. Such a current may induce a magnetic field o produce a repulsive force with respect to magnet 930. Accordingly, a lens assembly 960 mounted on coil 950 may move away from magnet 930 to increase a distance between lens assembly 960 and an image sensor 910 substantially along a direction depicted by arrow 980. Meanwhile, a leaf spring 940 may be attached to coil 950 to apply a restoring force to coil 950.

Figure 11:
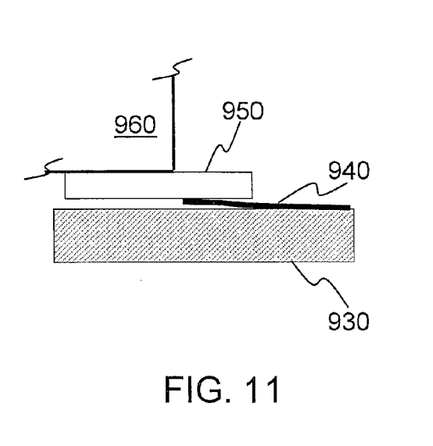
FIG. 11 is a close-up view of a non-activated actuator, according to an embodiment.

In FIG. 11, such an actuator may be non-activated if, for example, there is no electrical current travelling through coil 950. Lacking such a current, there may be no magnetic field to produce a repulsive force with respect to magnet 930. Accordingly, a lens assembly 960 mounted on coil 950 may remain close to magnet 930 to maintain a distance between lens assembly 960 and an image sensor 910. Such examples are limited to an actuator that is activated or not activated. Alternatively, an actuator may involve varying degrees of activation based, at least in part, on a varying magnitude of electrical current travelling in a coil 950. Such varying degrees of activation may provide varying distances between lens assembly 960 and an image sensor 910 to precisely control a focus of light onto image sensor 910. For example, a distance between lens assembly 960 and image sensor 910 may be based, at least in part, on a magnetic field, wherein such a distance is measured along an optical axis of a lens assembly. Of course, such details of a compact imaging module are merely examples, and claimed subject matter is not so limited.

Figure 12:
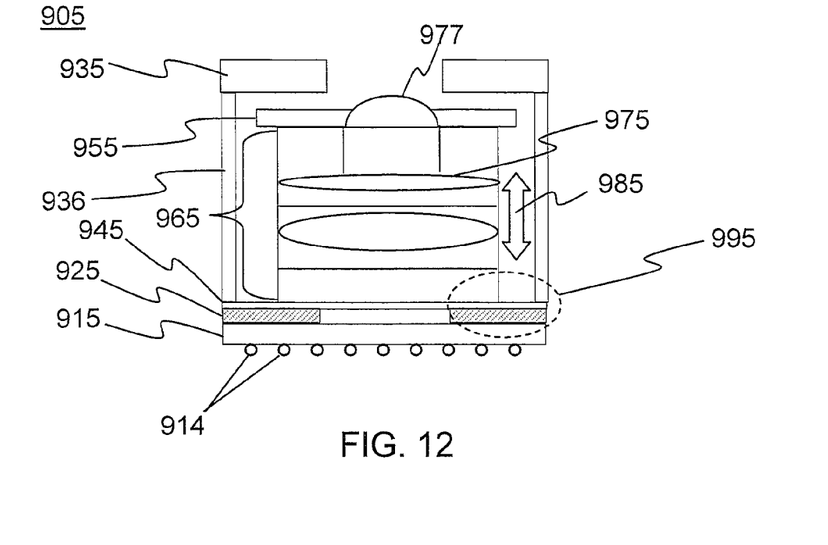
FIG. 12 is a side view of a compact imaging module, according to another embodiment.

FIG. 12 is a side view of a compact imaging module 905, according to an embodiment. Such an imaging module may comprise an image sensor 915, which may be similar to image sensor 910 shown in FIG. 9, for example. Imaging module 905 may further comprise a lens assembly 965, which may include one or more lens units 975 to provide an image onto an active region (not shown) of image sensor 915. In one particular implementation, lens assembly 965 may comprise at least a portion of a lens 977 that extends beyond one or more actuator elements such as a magnet 935 and a coil 955. Magnet 935 may be supported by a magnet supporting unit 936. So that such an image is focused onto image sensor 915, an actuator may adjust a position of lens assembly 965 with respect to image sensor 915. Such positioning is depicted by arrow 985, for example. A portion of such an actuator that is disposed below lens assembly 965 may comprise a leaf spring 945, whereas another portion disposed above at least a portion of lens assembly 965 may comprise magnet 935 and coil 955. Such a lens assembly may comprise one or more lenses, and the vertical position of one or more such lenses may be adjusted as a group by an actuator. In a particular implementation, compact imaging module 905 may further comprise a spacer 925 disposed between leaf spring 945 and image sensor 915, for example. Image sensor 915 may comprise ball grid array 914 for electrical connections to one or more external components (not shown).

Figures 13, 14:
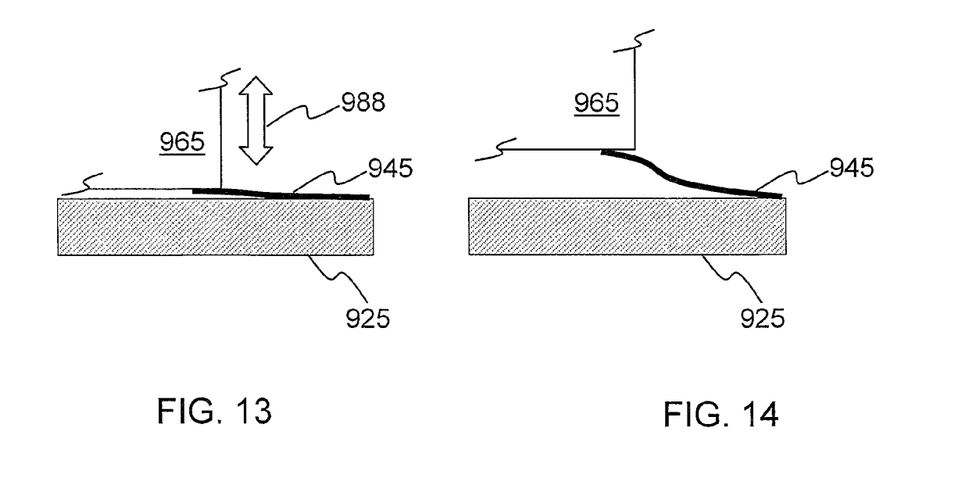
FIG. 13 is a close-up view of an activated actuator, according to an embodiment.
FIG. 14 is a close-up view of a non-activated actuator, according to an embodiment.

Portion 995 depicts a region of compact imaging module 905 that may vary in configuration in response to actuator operation. Example configurations of portion 995 are shown in detail in FIGS. 13 and 14. In a particular implementation, an actuator may be activated if, for example, an electrical current travels through coil 955. Such a current may induce a magnetic field to produce a repulsive force with respect to magnet 935. Accordingly, a lens assembly 965 mounted below coil 955 may move away from magnet 935 to decrease a distance between lens assembly 965 and an image sensor 915 substantially along a direction depicted by arrow 988. Meanwhile, a leaf spring 945 may be attached to a bottom portion of lens assembly 965 to apply an upward restoring force to lens assembly 965. In another particular implementation, an actuator may be activated by an electrical current travelling through coil 955 to induce a magnetic field producing an attractive force with respect to magnet 935. Accordingly, a lens assembly 965 mounted below coil 955 may move toward magnet 935 to increase a distance between lens assembly 965 and an image sensor 915 substantially along a direction depicted by arrow 988. In still another particular implementation, an actuator may be non-activated if, for example, there is no electrical current travelling through coil 955. Lacking such a current, there may be no magnetic field to produce a repulsive or attractive force with respect to magnet 930. Accordingly, a lens assembly 965 mounted below coil 955 may remain close to magnet 935 to maintain a distance between lens assembly 965 and an image sensor 915. Such examples are limited to an actuator that is activated or not activated. Alternatively, an actuator may involve varying degrees of activation based, at least in part, on a varying magnitude of electrical current travelling in a coil 955. Such varying degrees of activation may provide varying distances between lens assembly 965 and an image sensor 915 to precisely control a focus of light onto image sensor 915. Of course, such details of a compact imaging module are merely examples, and claimed subject matter is not so limited.

Figure 15:
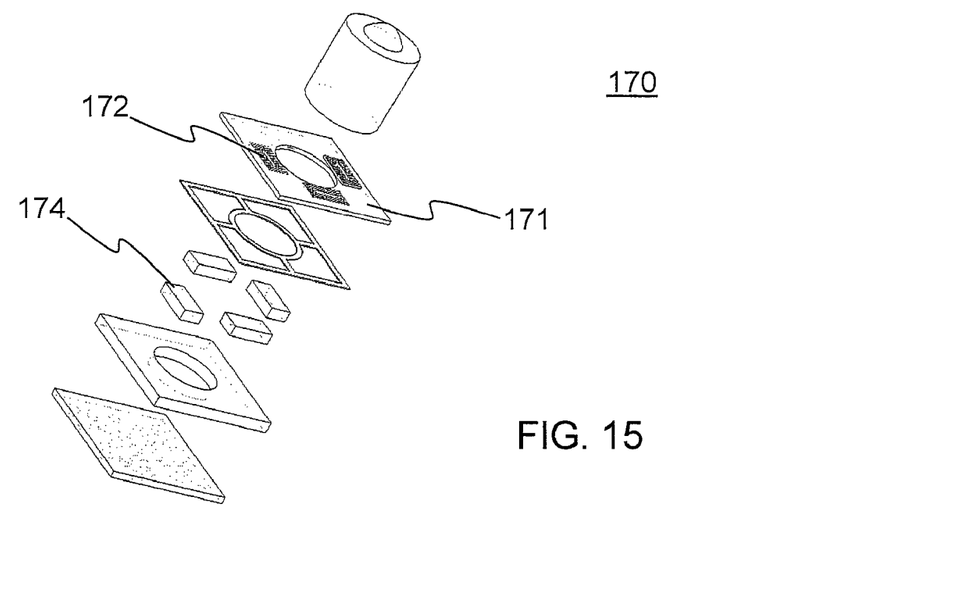
FIG. 15 is a perspective view of components that comprise a compact imaging module, according to one embodiment.

FIG. 15 is a perspective view of components that comprise a compact imaging module 170, according to one embodiment. A coil component 171 may comprise a multiple number of individual coils 172. In a particular implementation, coil component 171 may comprise four such coils 172, which may be positioned in a single plane. Compact imaging module 170 may also comprise multiple individual magnets 174. For example, compact imaging module 170 may comprise four such magnets, which may have a one-to-one correspondence with four coils 172, though claimed subject matter is not so limited.

Figure 16:
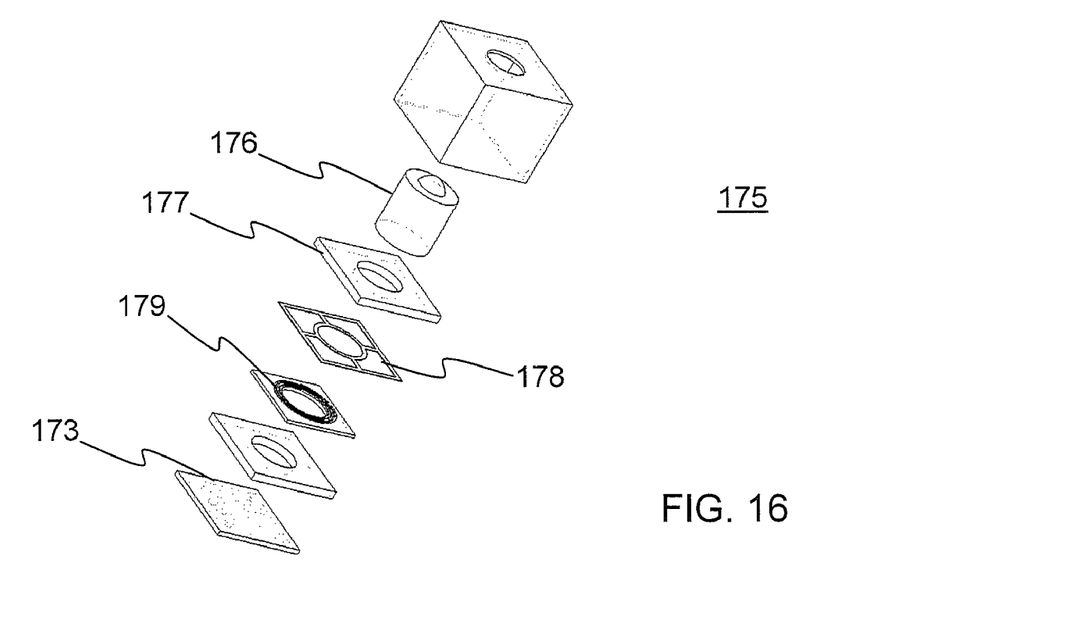
FIG. 16 is a perspective view of components that comprise a compact imaging module, according to another embodiment.

FIG. 16 is a perspective view of components that comprise a compact imaging module 175, according to another embodiment. A magnet 177 may be disposed between a spring component 178 and a lens assembly 176. In addition, one or more coils 179 may be disposed between spring component 178 and image sensor 173. Such an arrangement may be compared with the embodiment shown in FIG. 1, for example. Magnet 177 may be attached to lens assembly 176. If energized, a magnetic field produced by electric current flowing in coil 179 positioned below magnet 177 interacting with the magnet 177 may provide a force to move lens assembly 176 and magnet 177 along the optical axis. In another configuration, coil 179 may be positioned above magnet 177, though claimed subject matter is not so limited.

Figure 17:
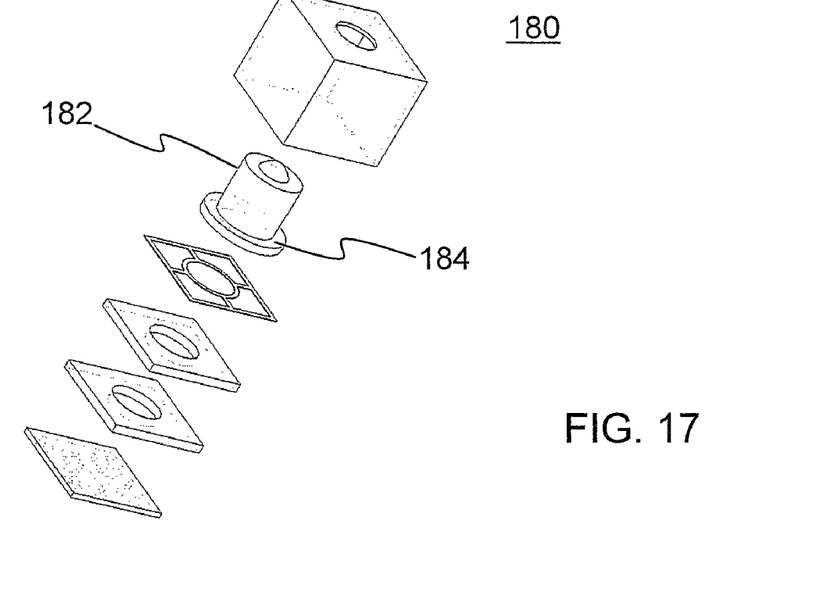
FIG. 17 is a perspective view of components that comprise a compact imaging module, according to still another embodiment.

FIG. 17 is a perspective view of components that comprise a compact imaging module 180, according to still another embodiment. One or more coils 184 may be mounted and/or directly coated on a lens assembly surface 182, though claimed subject matter is not so limited.

Figure 18:
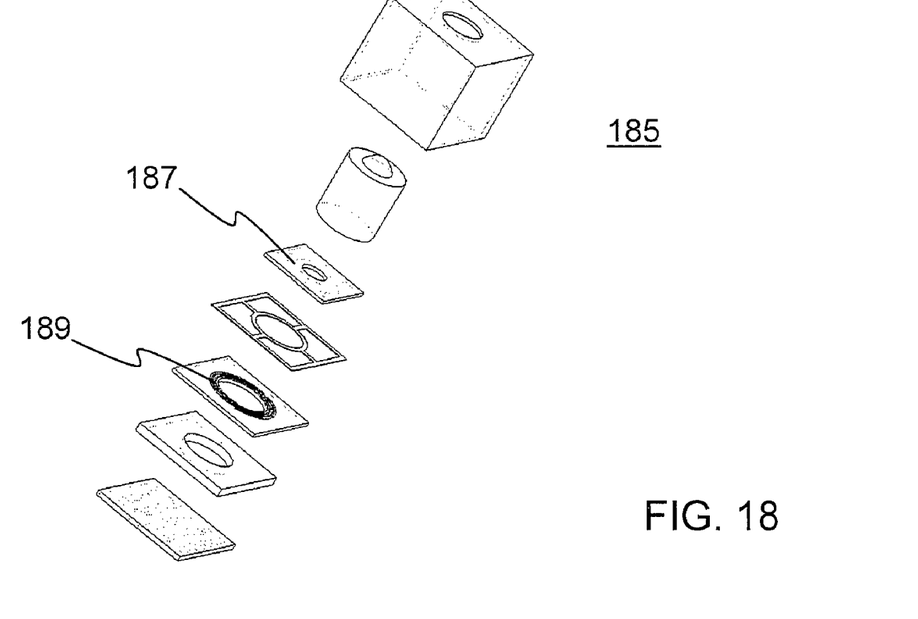
FIG. 18 is a perspective view of components that comprise a compact imaging module, according to yet another embodiment.

FIG. 18 is a perspective view of components that comprise a compact imaging module 185, according to yet another embodiment. Such a module may include coil 187 and/or coil 189 in place of magnets that are otherwise included in other embodiments described above.

One skilled in the art will realize that a virtually unlimited number of variations to the above descriptions is possible, and that the examples and the accompanying figures are merely to illustrate one or more particular implementations.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
   a lens assembly including one or more lenses;
   an image sensor to receive light from said lens assembly; and
   an actuator to adjust a position of said lens assembly, said actuator including at least one magnet and at least one coil to produce an electromagnetic force wherein at least a portion of said actuator is disposed between said lens assembly and said image sensor, wherein said actuator is mounted on said image sensor, wherein a surface area of said actuator does not extend substantially beyond a surface area of said image sensor, and wherein said coil and said magnet are arranged substantially orthogonal to an optical axis of said lens assembly, wherein a distance between said lens assembly and said image sensor is adjustable, at least in part, in response to said electromagnetic force, wherein said distance is measurable along an optical axis of said lens assembly.

2. An apparatus comprising:
   a lens assembly including one or more lenses;
   an image sensor to receive light from said lens assembly; and an actuator to adjust a position of said lens assembly, said actuator including at least one magnet and at least one coil to produce an electromagnetic force wherein at least a portion of said actuator is disposed between said lens assembly and said image sensor, wherein said actuator is mounted on said image sensor, wherein a surface area of said actuator does not extend substantially beyond a surface area of said image sensor, and wherein said coil and said magnet are arranged substantially orthogonal to an optical axis of said lens assembly, wherein a distance between said magnet and said image sensor is adjustable, at least in part, in response to said electromagnetic force, wherein said distance is measurable along an optical axis of said lens assembly.

3. A method comprising:
mounting a lens assembly including one or more lenses to a portion of an actuator that includes at least one magnet and at least one coil to produce an electromagnetic force;
positioning an image sensor to receive light from said lens assembly; and
mounting said actuator on said image sensor, wherein a surface area of said actuator does not extend substantially beyond a surface area of said image sensor, and wherein said coil and said magnet are arranged substantially orthogonal to an optical axis of said lens assembly, wherein a distance between said lens assembly and said image sensor is adjustable, at least in part, in response to said electromagnetic force, wherein said distance is measurable along an optical axis of said lens assembly.

4. The method of claim 3, further comprising mounting at least one spring on said image sensor.

5. The method of claim 4, wherein said coil and said spring comprise a single component comprising a coil region and a spring region.

6. The method of claim 5, further comprising providing electrical current to said coil region via said spring region.

7. The method of claim 4, further comprising mounting at least a portion of said lens assembly between said magnet and said spring and between said coil and said spring.

8. The method of claim 3, further comprising mounting at least one spring on said lens assembly.

9. The method of claim 3, further comprising attaching said coil to said lens assembly.

10. The method of claim 3, wherein said coil is adapted to move with said lens assembly if said coil is energized.

11. The method of claim 3, wherein said magnet is adapted to move with said lens assembly if said coil is energized.

* * * * *